(12) United States Patent
Wang et al.

(10) Patent No.: US 8,284,260 B2
(45) Date of Patent: Oct. 9, 2012

(54) OPTIMAL RAW RGB DETERMINATION FOR COLOR CALIBRATION

(75) Inventors: Xiaoling Wang, San Jose, CA (US);
Farhan Baqai, Fremont, CA (US);
Takami Mizukura, Kanagawa (JP);
Naoya Kato, Chiba (JP)

(73) Assignee: Sony Corporation, Tokyo (JP)

( * ) Notice: Subject to any disclaimer, the term of this patent is extended or adjusted under 35 U.S.C. 154(b) by 377 days.

(21) Appl. No.: 12/732,525

(22) Filed: Mar. 26, 2010

(65) Prior Publication Data

US 2011/0234811 A1    Sep. 29, 2011

(51) Int. Cl.
*H04N 17/02* (2006.01)
*H04N 9/73* (2006.01)

(52) U.S. Cl. ..................................... 348/188; 348/223.1

(58) Field of Classification Search .................. 348/187, 348/188, 223.1, 659–661, 655; 702/85, 108; H04N 17/00, 17/02, 9/73, 9/67
See application file for complete search history.

(56) References Cited

U.S. PATENT DOCUMENTS

| | | | |
|---|---|---|---|
| 6,005,968 A | 12/1999 | Granger | |
| 6,816,187 B1 | 11/2004 | Iwai et al. | |
| 7,362,357 B2 | 4/2008 | Brown et al. | |
| 2005/0213128 A1 | 9/2005 | Imai et al. | |
| 2007/0043527 A1 | 2/2007 | Quan et al. | |
| 2007/0230774 A1 | 10/2007 | Baqai et al. | |
| 2009/0002545 A1 | 1/2009 | Heinonen et al. | |
| 2009/0080004 A1 | 3/2009 | Wang et al. | |
| 2010/0231725 A1* | 9/2010 | Wang et al. | 348/181 |

FOREIGN PATENT DOCUMENTS

| | | |
|---|---|---|
| EP | 1808680 A2 | 7/2007 |
| JP | 07-055569 A | 3/1995 |
| JP | 2006-050390 A | 2/2006 |
| JP | 2009-022046 A | 1/2009 |

OTHER PUBLICATIONS

Korean Intellectual Property Office, International Search Report and Written Opinion, counterpart PCT Application No. PCT/US2011/024835, including claims searched, Sep. 26, 2011, pp. 1-12.
Martinez-Verdu, Francisco et al.—"Calculation of the Color Matching Functions of Digital Cameras from Their Complete Spectral Sensitivities"—Journal of Imaging Science and Technology, vol. 46, No. 1, pp. 15-25, 55-58, Jan./Feb. 2002.
Wolski, Mark et al.—Optimization of Sensor Response Functions for Colorimetry of Reflective and Emissive Objects—IEEE Transactions on Image Processing, vol. 5, No. 3, Mar. 1996.

(Continued)

*Primary Examiner* — Sherrie Hsia
(74) *Attorney, Agent, or Firm* — John P. O'Banion

(57) ABSTRACT

Improving color calibration, and similar operations, by generating an optimal raw RGB color chart, in the raw RGB domain, for an imaging device with a given type of image sensor, such as for a digital still camera. Calibration is performed in response to a constraint which takes into account the spectral sensitivity of the image sensor used on the camera as well as spectral reflectance and spectral radiance of multiple illuminants. Calibration is performed using the raw RGB color chart which is illuminant independent and image sensor specific and which can match the calibration performance of known calibration standards, such as Macbeth 24.

20 Claims, 7 Drawing Sheets

OTHER PUBLICATIONS

Wang, Xiaoling et al.—"Illuminant Independent Color Calibration Using Colored Rays Approach"—U.S. Appl. No. 12/404,859, filed Mar. 16, 2009—not yet published.

Lee, D. et al.—"Learning the parts of objects by non-negative matrix factorization", Nature, vol. 401, pp. 788-791, Oct. 21, 1999.

Lee, D. et al.—"Algorithms for Non-Negative Matrix Factorization", Advances in Neural and Information Processing Systems, vol. 13, pp. 556-562, 2001.

Ding, C. et al.-"Orthogonal Nonnegative Matrix Tri-Factorizations for Clustering"-Proceedings of International Conference on Knowledge Discovery and Data Mining, pp. 126-135, Aug. 2006.

Quan, S.-"Evaluation and Optimal Design of Spectral Sensitivities for Digital Color Imaging"-Chester F. Carlson Center for Imaging Science of the College of Science, Rochester Institute of Technology, pp. 1-276, Apr. 2002.

Buchsbaum, G. et al.-"Color categories revealed by non-negative matrix factorization of Munsell color spectra"-Vision Research, vol. 42, pp. 559-563, 2002.

Bodvarsson, B. et al.-"NMF on Positron Emission Tomography"-Proceedings of IEEE Conference on Acoustics, Speech, and Signal Processing, pp. I-309-I-312, Apr. 2007.

* cited by examiner

OPTIMAL RAW RGB DETERMINATION FOR COLOR CALIBRATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to camera color calibration, and more particularly to performing accurate calibration with small calibration color sets.

2. Description of Related Art

Color charts are utilized in a number of color-related fields for performing various types of color characterization, calibration, correction, adjustment, and so forth. A color chart comprises a physical arrangement of standardized color samples, used for color comparisons and measurements such as in calibrating an image sensor, checking the color reproduction of an imaging system, demosaicking, denoising, white balancing, color correction and so forth. Standardized color chart targets are produced by a number of companies.

Color charts are often used in calibrating the response of digital imaging (camera) devices. Digital imaging devices proliferate our modern world, from cell phones, point-and-shoot cameras, video cameras, digital SLRs, as well as high-end still and video camera equipment. One of the challenges of manufacturing this equipment is that of providing a correct color calibrations, and similar characterizations and/or response modifications of color imagers and systems.

It will be recognized that various types of sensing elements are employed in the manufacture of digital imaging devices, which may utilize RGB, RGBE, CMYG sensors, and others. Each type and model of sensing device has its unique spectral sensing characteristics and presents different performance in color calibration. In addition, variations exists even for a given sensor model, between and even within a given manufactured lot.

Providing proper calibration requires determination of a linear adjustment matrix (AM) to match the XYZ or L*a*b* values determined from the actual camera to that of human visual perception. One typical method of performing color calibration involves the use of a color chart. For example, the color chart typically used in digital still camera (DSC) color calibration usually consists of multiple color patches as the calibration target. It would seem that the more color patches used, the better would be the resultant calibration performance. However, in practice this is not always true because colors are basically energy distributions in a spectral range. Various colors inevitably have spectral redundancy which can be reduced without affecting the overall calibration.

Previous color calibration applications by the applicant have separately described the use of a non-negative matrix factorization approach to directly estimate a color chart with a reduced number of colors, and added an orthogonality constraint to optimize the calibration chart in the 2nd order statistical range. Regarding the orthogonality constraint the optimal color set provided approximately the same calibration performance as rendered by the use of large color sets (e.g., Macbeth Color Chart having 24 patches), while significantly reducing the number of color patches (e.g., down to seven), with calibration being performed in response to multiple illuminants. Another application described an extended approach which derived an additional constraint for generating an illuminant-independent colored rays set for color calibration.

However, each of the above methods requires a color chart with spectral reflectance which has similar $2^{nd}$ order statistical characteristics of a calibration standard such as found in the Macbeth color checker standard. The above techniques all require significant calibration time to perform even though they provide for creating a useful color calibration chart with a significantly reduced number of color patches.

Accordingly a need exists for a system and method of performing illuminant independent color calibration in a short calibration cycle. These needs and others are met within the present invention, which overcomes the deficiencies of previously developed color calibration systems and methods.

BRIEF SUMMARY OF THE INVENTION

The present invention appreciates the need for incorporating the effects of various spectral sensitivities and performing calibration in the raw RGB domain when generating optimal color charts (e.g., containing a plurality of color patches) and performing calibration. For generality, a representative spectral sensitivity should be used for each type of sensing device.

Color calibration is performed according to the invention in response to generation of an optimal raw RGB chart for each specific type of image sensor. A constraint is derived in this process which matches the calibration performance between the optimal raw RGB chart and a desired color standard, such as the Macbeth Color Checker, in response to multiple illuminants for a specific sensor. Orthogonal non-negative matrix factorization (ONMF) is applied with above constraint to obtain an optimal raw RGB chart which is illuminant independent and image sensor specific. It will be appreciated that optimal RGB calibration cannot be attained until the sensitivity of the imaging device is properly taken into account. Using the present invention color error can be reduced while the time required for calibrating a camera can be substantially reduced, and is particularly useful for camera manufacturers.

The invention is amenable to being embodied in a number of ways, including but not limited to the following descriptions.

One embodiment of the invention is an apparatus for generating an optimal raw RGB illumination independent color chart for use with an image sensor, comprising: (a) a computer configured for performing image processing; and (b) programming executable on said computer for, (b)(i) representing spectral sensitivity for a specific type of image sensor; (b)(ii) deriving a constraint to match calibration performance between a desired optimal raw RGB color chart and a desired color standard under multiple illuminants for a specific type of image sensor; (b)(iii) applying orthogonal non-negative matrix factorization (ONMF) with the constraint; and (b)(iv) generating an optimal raw RGB color chart for use when collecting an optimal raw RGB data set when performing illuminant independent, image sensor specific color calibration operations. The optimal raw RGB color chart is configured to incorporate various spectral sensitivities performance matching of the desired color standard under multiple illuminants, and can provide the same calibration performance as a known calibration standard, such as a Macbeth Color Checker. In at least one implementation, the optimal raw RGB color chart is preferably determined in response to non-negative matrix factorization (ONMF) of a comparison between the adjustment matrix and a known calibration adjustment matrix. The optimal raw RGB data set using the optimal RGB color chart incorporates illuminant variation so that illuminant-independent calibration can be performed in response to capturing a single image with the color chart.

In at least one implementation, the constraint is derived by programming executable on said computer for: (a) integrating spectral reflectance of the desired color standard, spectral radiance of multiple illuminants, and representative spectral sensitivities of the specific type of image sensor; (b) determining an optimal calibration matrix for the desired color standard; (c) determining an optimal calibration matrix for the optimal raw RGB calibration matrix; and (d) generating said constraint in response to equalizing optimal calibration matrixes for the desired color standard and the optimal raw RGB calibration.

In at least one implementation, the programming is configured for calibrating an image sensor utilizing said optimal raw RGB color chart, comprising: (a) performing a white balance under a plurality of different illuminants and initializing an adjustment matrix and determining a response in an XYZ color space and transforming it to a first response in a L*a*b* color space; (b) determining a response in an XYZ color space under a plurality of different illuminants and transforming it to a second response in a L*a*b* color space; and (c) modifying said adjustment matrix to minimize error between said first L*a*b* result and said second L*a*b* result toward optimizing calibration.

One embodiment of the invention is an apparatus for performing color calibration of a specific type of image sensor within a camera device, comprising: (a) a computer configured for performing image processing; and (b) programming executable on said computer for, (b)(i) generating an optimal raw RGB color chart in response to representing spectral sensitivity for a specific type of image sensor with a constraint derived to match calibration performance with a desired color standard under multiple illuminants, and applying orthogonal non-negative matrix factorization (ONMF) with the constraint, (b)(ii) performing a white balance under a plurality of different illuminants and initializing an adjustment matrix, determining a first response in an XYZ color space and transforming it to a first response in an L*a*b* color space, (b)(iii) determining a second response in an XYZ color space under a plurality of different illuminants and transforming it to a second response in the L*a*b* color space, and (b)(iv) modifying said adjustment matrix to minimize error between said first response in the L*a*b* color space and said second response in the L*a*b* color space. The optimal raw RGB color chart is configured to incorporate various spectral sensitivities for matching the performance of the desired color standard under multiple illuminants, and can provide the same calibration performance as a known calibration standard, such as the Macbeth Color Checker.

In at least one implementation, the constraint is derived by programming executable on said computer for: (a) integrating spectral reflectance of the desired color standard, spectral radiance of multiple illuminants, and representative spectral sensitivities for the specific type of image sensor; (b) determining an optimal calibration matrix for the desired color standard; (c) determining an optimal calibration matrix for the optimal raw RGB calibration matrix; and (d) generating said constraint in response to equalizing the optimal calibration matrixes for the desired color standard and the optimal raw RGB calibration.

One embodiment of the invention is a method of generating an optimal raw RGB color chart for use in color calibration using a specific type of image sensor for a camera device being calibrated, comprising: (a) representing spectral sensitivity for a specific type of image sensor; (b) deriving a constraint to match calibration performance between a desired optimal raw RGB chart and a standard under multiple illuminants for the specific type of image sensor for the camera device; (c) applying orthogonal non-negative matrix factorization (ONMF) with the constraint; and (d) generating an optimal raw RGB color chart for use in performing illuminant independent, image sensor specific, color calibration. The optimal raw RGB color chart can provide identical performance as a standard color checker, such as the Macbeth Color Checker, while having fewer color swatches and configured for use with a single illuminant source.

The present invention provides a number of beneficial aspects which can be implemented either separately or in any desired combination without departing from the present teachings.

An aspect of the invention is a method for generating an optimal raw RGB color chart which can be utilized to simplify color characterization, calibration, correction, adjustment, and so forth.

Another aspect of the invention is a method for generating an optimal raw RGB color chart which requires fewer color swatches than required by known calibration standards provide similar result quality.

Another aspect of the invention is a method for generating an optimal raw RGB color chart which can be utilized with a single illuminant which simulates the performance of known calibrations standards using multiple illuminants.

Another aspect of the invention is a method for improving color calibration process, such as for digital still image cameras.

Another aspect of the invention is a calibration method which provides the same calibration performance as a large color set (e.g., Macbeth 24).

Another aspect of the invention is the generation of an optimal raw RGB color chart for use in calibrating cameras.

Another aspect of the invention is a calibration method which is directed for use with a specific type of image sensor, for the camera being calibrated.

Another aspect of the invention is a calibration method which is illumination independent, but image sensor specific.

Another aspect of the invention is a calibration method which determines a constraint based on a comparison with a desired color standard.

Another aspect of the invention is a color calibration method which uses orthogonal non-negative matrix factorization (ONMF) with the constraint.

A still further aspect of the invention is a calibration apparatus and method which can be applied to various types of cameras.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Referring more specifically to the drawings, for illustrative purposes the present invention is embodied in the apparatus generally shown in FIG. 1 through FIG. 8. It will be appreciated that the apparatus may vary as to configuration and as to details of the parts, and that the method may vary as to the specific steps and sequence, without departing from the basic concepts as disclosed herein.

1. Introduction.

A representative sensor spectral sensitivity is selected for each type of sensing device. It should be recognized that the spectral sensitivity function measures the sensitivity distribution along all wavelengths of light and it is different for each specific sensing device, such as CCD and CMOS sensors. In a given application, spectral sensitivity can be represented by a discrete vector for which the values can be obtained using a spectrometer Aspects of color calibration according to the present invention provide overcoming part variations in digital still camera (DSC) imaging sensors. Therefore, it is necessary to incorporate the effect of various sensor spectral sensitivities into the generation of a calibration target toward increasing accuracy and calibration performance. By integrating sensor spectral sensitivities, illuminant spectral distributions, and spectral reflectance of a set of color patches, raw RGB data is obtained. One aspect of the present invention is thus directed to deriving the optimal raw RGB for color calibration. Aspects of the invention consider the Macbeth Color Checker as a recognized color chart with satisfactory calibration performance, whereby the goal in generating the optimal raw RGB chart is to match the performance of Macbeth Color Checker under multiple illuminants. Other aspects of the invention provide mechanisms for optimizing the raw RGB chart, and using it for performing color calibration of a camera device.

2. Calibration Process Using Raw RGB Data Set.

In a conventional calibration flow, it is necessary to capture three pictures under different illumination sources for optimizing the adjustment matrix (e.g., $AM_{MC24}$ of Macbeth Color Checker) to minimize a comprehensive color error metric $CEM_{color}$. Accordingly, three images (shots) have to be captured and managed through hardware and mechanical techniques to calibrate each device. However, in the present invention, illuminant variation is incorporated into the determination of the optimal raw RGB data set. Therefore, only one picture needs to be captured for performing illuminant-independent calibration.

Figure 1:
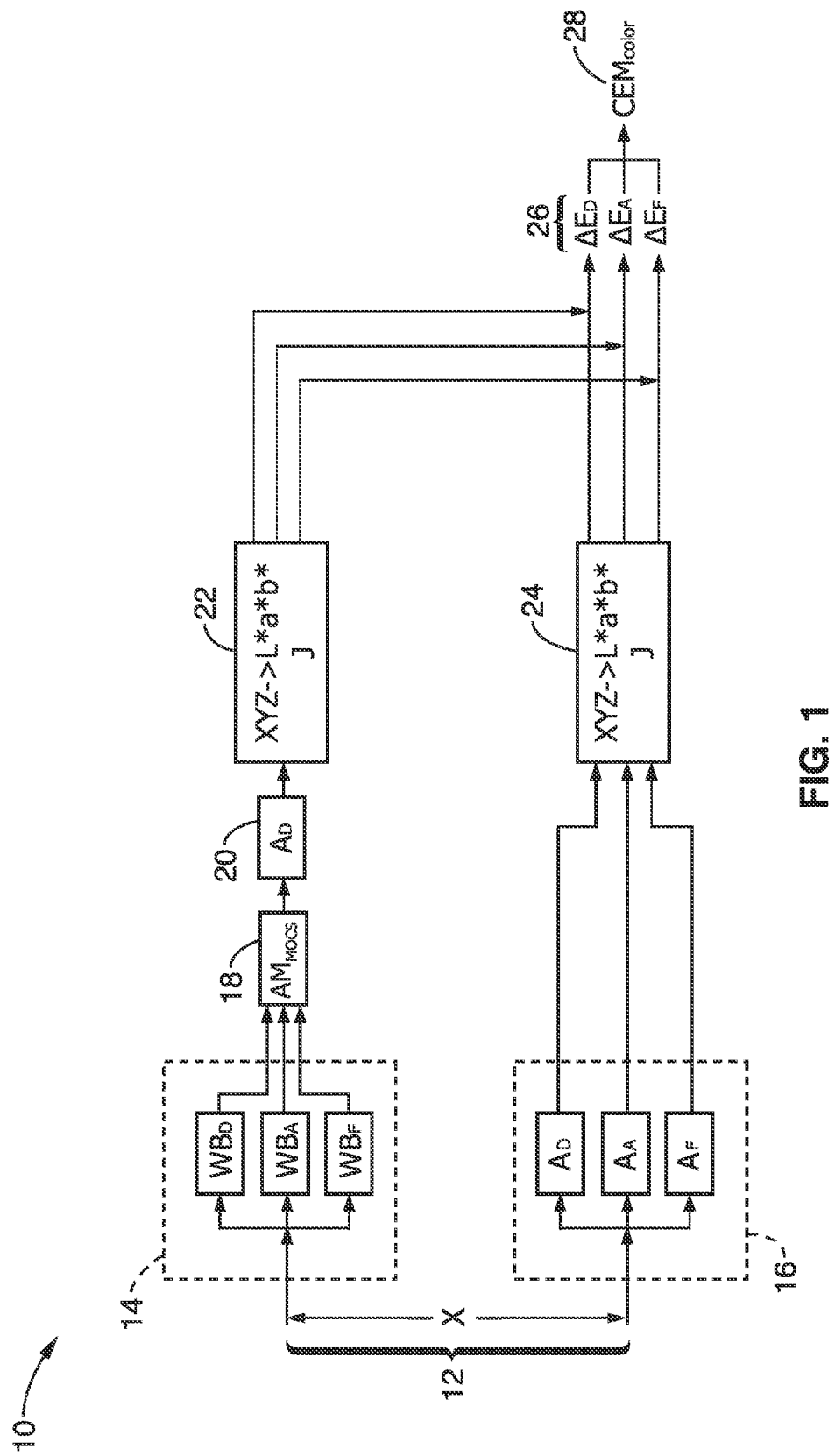
FIG. 1 is a schematic of calibration flow utilizing adjustment matrix ($AM_{MOCS}$) according to an aspect of the invention.

FIG. 1 illustrates calibration flow using optimal raw RGB data set X applied to an adjustment matrix, such as $AM_{MOCS}$, in which the subscript "MOCS" stands for "Minimal Optimal Color Set". The inputs include sensor spectral sensitivity S, the spectral reflectance of Macbeth Color Checker R, and three illuminant distributions D65, A, and F6.

Multiple illuminant response to a raw RGB input X 12 is shown being received by an apparatus for performing the color calibration. Preferably, programming within the apparatus carries out the steps, although any combination of dedicated and/or programmatic (i.e., capable of being programmed and executing programming thereof) means may be utilized without limitation according to aspects of the present invention. Block 14 depicts white balance for three illuminants D, A, and F (e.g., D65, A and F6) received by an adjustment matrix 18, designated $AM_{MOCS}$ which is initialized at block 20 and converted at block 22 from an XYZ color space to a first set of values in the L*a*b* color space. A reference 16, under the three illuminants D, A and F are converted at block 24 from the CIE XYZ color space to a second set of values in the L*a*b* color space. These first and second sets of results in the L*a*b* color space are compared at 26 (e.g., difference obtained) to generate a Color Error Metric (CEM) 28, utilized toward correcting the adjustment matrix $AM_{MOCS}$ according to the invention.

Figure 3:
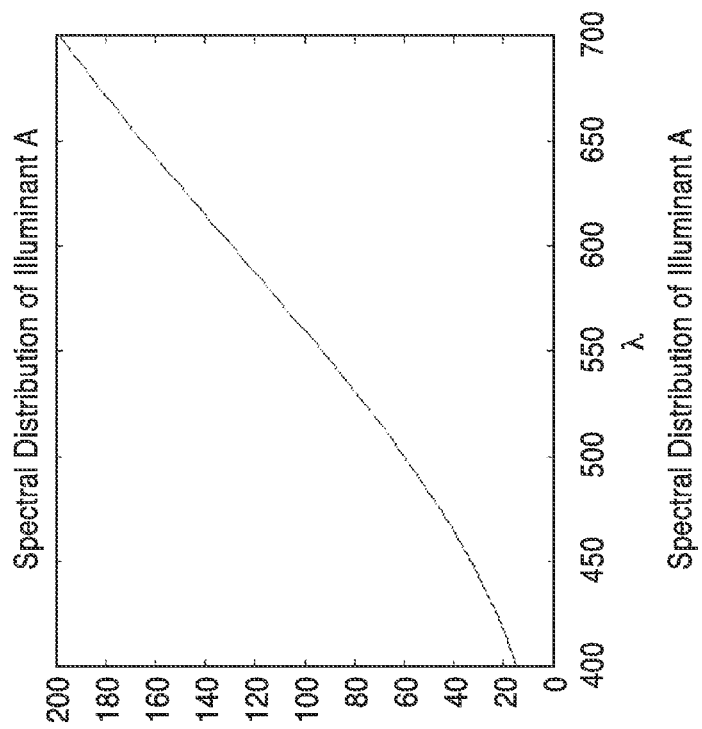
FIG. 3 is a graph of spectral distribution of illuminant A utilized according to an aspect of the present invention.
Figure 2:
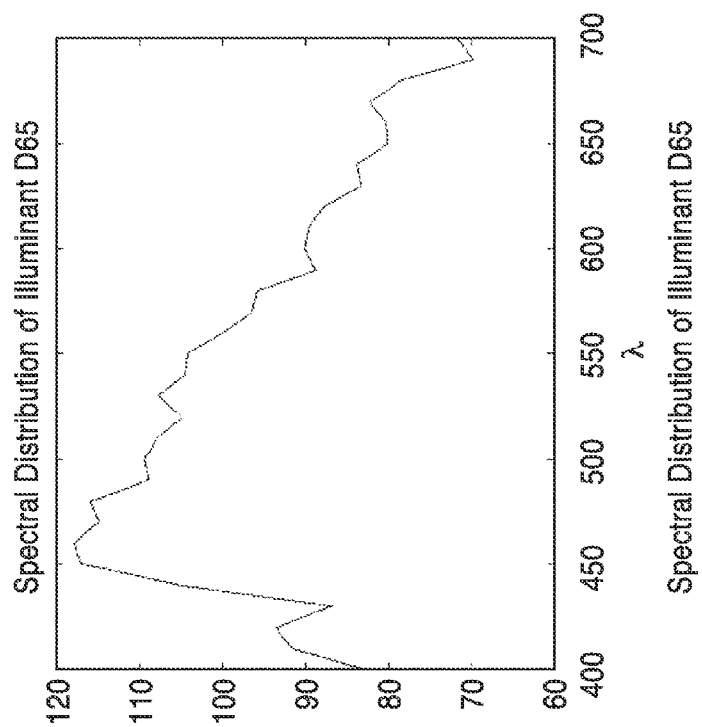
FIG. 2 is a graph of spectral distribution of illuminant D65 utilized according to an aspect of the present invention.
Figure 4:
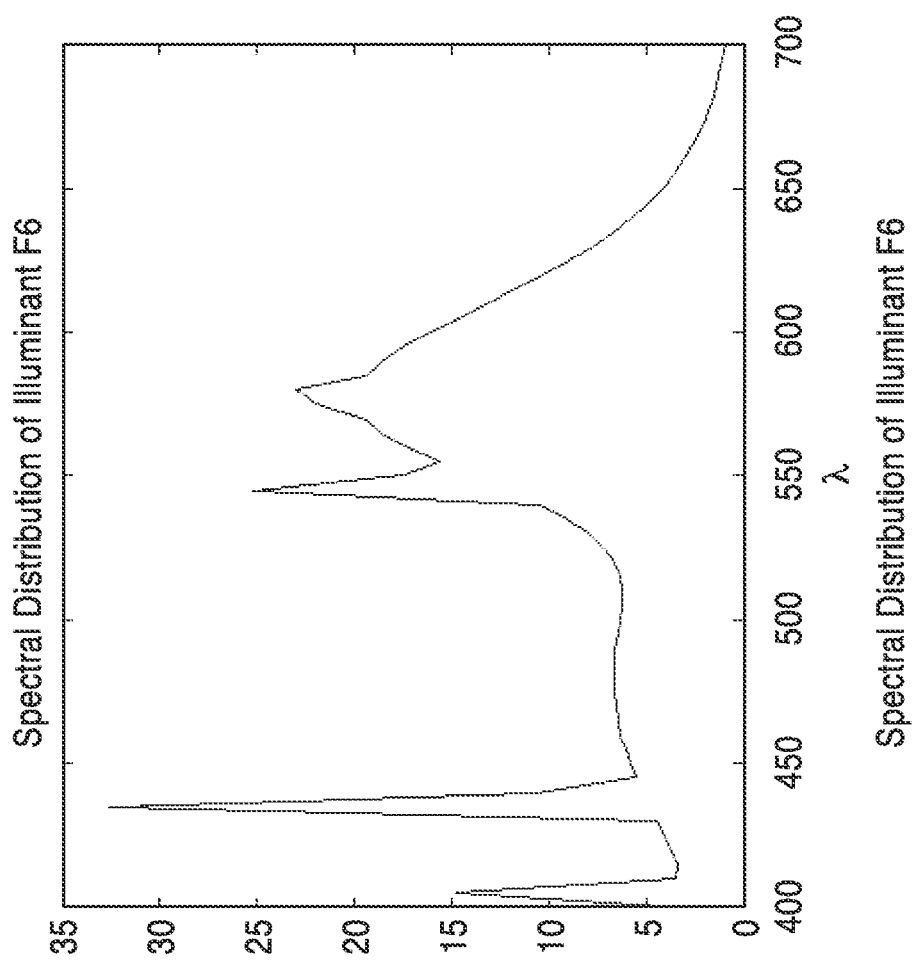
FIG. 4 is a graph of spectral distribution of illuminant F6 utilized according to an aspect of the present invention.

FIG. 2 through FIG. 4 illustrate spectral distributions of D65, A, and F6 illumination sources, described for use herein by way of example and not limitation, as the present invention can be utilized for performing calibrations which follow any desired set of illumination sources to generate an optimal raw RGB color chart as it is illuminant independent. One of ordinary skill in the art will recognized that D65, A and F6 are standard illuminants defined under the International Commission on Illumination (CIE) which publishes well-known standard illuminants. Each illuminant source is known by a letter or by a letter-number combination. Illuminant A represents average incandescent light, F6 represent a fluorescent lamp within a range (F1-F12) of different fluorescent light types, and D65 represents daylight illumination at midday. Generation of an optimal raw RGB color chart can be provided by the present invention to provide the same benefits as if calibration were performed with any selected set of illuminants, while only requiring a single illuminant because the inventive method is illumination source independent.

The goal of color calibration according to the invention is to determine an optimal adjustment matrix AM in order to minimize a color error metric, for example, $CEM_{color}$. Therefore, the calibration can be formulated as $$AM_{MOCS} \Leftarrow \min(CEM_{color}) \Leftrightarrow \min(CEM_{color}^2)$$

where the optimization metric can be formulated as:

$$CEM_{color}^2 = w_D \sum_{i=1}^{r}(\Delta L_{iD\_MOCS}^2 + \Delta a_{iD\_MOCS}^2 + \Delta b_{iD\_MOCS}^2) + \quad (1)$$

$$w_A \sum_{i=1}^{r}(\Delta L_{iA\_MOCS}^2 + \Delta a_{iA\_MOCS}^2 + \Delta b_{iA\_MOCS}^2) +$$

$$w_F \sum_{i=1}^{r}(\Delta L_{iF\_MOCS}^2 + \Delta a_{iF\_MOCS}^2 + \Delta b_{iF\_MOCS}^2) =$$

$$w_D \Delta L_{1D\_MOCS}^2 + w_D \Delta a_{1D\_MOCS}^2 + \Delta b_{1D\_MOCS}^2 + \ldots +$$
$$w_D \Delta L_{rD\_MOCS}^2 + w_D \Delta a_{rD\_MOCS}^2 + \Delta b_{rD\_MOCS}^2 + w_A \Delta L_{1A\_MOCS}^2 +$$
$$w_A \Delta a_{1A\_MOCS}^2 + \Delta b_{1A\_MOCS}^2 + \ldots + w_A \Delta L_{rA\_MOCS}^2 +$$
$$w_A \Delta a_{rA\_MOCS}^2 + \Delta b_{rA\_MOCS}^2 + w_F \Delta L_{1F\_MOCS}^2 + w_F \Delta a_{1F\_MOCS}^2 +$$
$$\Delta b_{1F\_MOCS}^2 + \ldots + w_F \Delta L_{rF\_MOCS}^2 + w_F \Delta a_{rF\_MOCS}^2 + \Delta b_{rF\_MOCS}^2$$

The order of summations can be rearranged and by using the definition of vector 2-norm, the following expression obtained.

$$CEM_{color}^2 = \quad (2)$$
$$w_D \Delta L_{1D\_MOCS}^2 + w_D \Delta a_{1D\_MOCS}^2 + w_D \Delta b_{1D\_MOCS}^2 + w_A \Delta L_{1A\_MOCS}^2 +$$
$$w_A \Delta a_{1A\_MOCS}^2 + w_A \Delta b_{1A\_MOCS}^2 + w_F \Delta L_{1F\_MOCS}^2 +$$
$$w_F \Delta a_{1F\_MOCS}^2 + w_F \Delta b_{1F\_MOCS}^2 + \ldots + w_D \Delta L_{rD\_MOCS}^2 +$$
$$w_D \Delta a_{rD\_MOCS}^2 + w_D \Delta b_{rD\_MOCS}^2 + w_A \Delta L_{rA\_MOCS}^2 +$$
$$w_A \Delta a_{rA\_MOCS}^2 + w_A \Delta b_{rA\_MOCS}^2 + w_F \Delta L_{rF\_MOCS}^2 +$$

$$w_F \Delta a_{rF\_MOCS}^2 + w_F \Delta b_{rF\_MOCS}^2 = \left\| \begin{bmatrix} \sqrt{w_D}\,\Delta L_{1D\_MOCS} \\ \sqrt{w_D}\,\Delta a_{1D\_MOCS} \\ \sqrt{w_D}\,\Delta b_{1D\_MOCS} \\ \sqrt{w_A}\,\Delta L_{1A\_MOCS} \\ \sqrt{w_A}\,\Delta a_{1A\_MOCS} \\ \sqrt{w_A}\,\Delta b_{1A\_MOCS} \\ \sqrt{w_F}\,\Delta L_{1F\_MOCS} \\ \sqrt{w_F}\,\Delta a_{1F\_MOCS} \\ \sqrt{w_F}\,\Delta b_{1F\_MOCS} \\ \vdots \\ \sqrt{w_D}\,\Delta L_{rD\_MOCS} \\ \sqrt{w_D}\,\Delta a_{rD\_MOCS} \\ \sqrt{w_D}\,\Delta b_{rD\_MOCS} \\ \sqrt{w_A}\,\Delta L_{rA\_MOCS} \\ \sqrt{w_A}\,\Delta a_{rA\_MOCS} \\ \sqrt{w_A}\,\Delta b_{rA\_MOCS} \\ \sqrt{w_F}\,\Delta L_{rF\_MOCS} \\ \sqrt{w_F}\,\Delta a_{rF\_MOCS} \\ \sqrt{w_F}\,\Delta b_{rF\_MOCS} \end{bmatrix} \right\|_2^2$$

Let $w_D' = \sqrt{w_D}$, $w_A' = \sqrt{w_A}$, $w_F' = \sqrt{w_F}$, and define J as the Jacobian matrix of the nonlinear transformation from the CIE defined XYZ space to the CIE defined L*a*b* space. It is recognized that in the CIE XYZ color space, the tristimulus values X, Y and Z do not represent the responses of the human eye, but instead are roughly red, green and blue, and may be considered 'derived' parameters from the red, green, blue colors. In a "Lab" color space, the L represents the lightness, while a and b represent the two color-opponent dimensions. Conversions can be made between these defined color spaces.

By utilizing vec(·) operator, the color error metric can be formulated as follows.

$$CEM_{color}^2 = \left\| vec \begin{bmatrix} w_D' \Delta L_{1D\_MOCS} & \ldots & w_D' \Delta L_{rD\_MOCS} \\ w_D' \Delta a_{1D\_MOCS} & \ldots & w_D' \Delta a_{rD\_MOCS} \\ w_D' \Delta b_{1D\_MOCS} & \ldots & w_D' \Delta b_{rD\_MOCS} \\ w_A' \Delta L_{1A\_MOCS} & \ldots & w_A' \Delta L_{rA\_MOCS} \\ w_A' \Delta a_{1A\_MOCS} & \ldots & w_A' \Delta a_{rA\_MOCS} \\ w_A' \Delta b_{1A\_MOCS} & \ldots & w_A' \Delta b_{rA\_MOCS} \\ w_F' \Delta L_{1F\_MOCS} & \ldots & w_F' \Delta L_{rF\_MOCS} \\ w_F' \Delta a_{1F\_MOCS} & \ldots & w_F' \Delta a_{rF\_MOCS} \\ w_F' \Delta b_{1F\_MOCS} & \ldots & w_F' \Delta b_{rF\_MOCS} \end{bmatrix} \right\|_2^2$$

$$= \left\| vec \begin{pmatrix} w_D' \begin{pmatrix} \begin{bmatrix} L_{D\_MOCS} \\ a_{D\_MOCS} \\ b_{D\_MOCS} \end{bmatrix}_{3 \times r} - \begin{bmatrix} L_{D\_ref} \\ a_{D\_ref} \\ b_{D\_ref} \end{bmatrix}_{3 \times r} \end{pmatrix} \\ w_A' \begin{pmatrix} \begin{bmatrix} L_{A\_MOCS} \\ a_{A\_MOCS} \\ b_{A\_MOCS} \end{bmatrix}_{3 \times r} - \begin{bmatrix} L_{A\_ref} \\ a_{A\_ref} \\ b_{A\_ref} \end{bmatrix}_{3 \times r} \end{pmatrix} \\ w_F' \begin{pmatrix} \begin{bmatrix} L_{F\_MOCS} \\ a_{F\_MOCS} \\ b_{F\_MOCS} \end{bmatrix}_{3 \times r} - \begin{bmatrix} L_{F\_ref} \\ a_{F\_ref} \\ b_{F\_ref} \end{bmatrix}_{3 \times r} \end{pmatrix} \end{pmatrix} \right\|_2^2$$

$$= \left\| vec \begin{bmatrix} w_D' \cdot J \cdot A_D \cdot AM_{MOCS} \cdot WB_D \cdot X - w_D' \cdot J \cdot A_D \cdot X \\ w_A' \cdot J \cdot A_D \cdot AM_{MOCS} \cdot WB_A \cdot X - w_A' \cdot J \cdot A_A \cdot X \\ w_F' \cdot J \cdot A_D \cdot AM_{MOCS} \cdot WB_F \cdot X - w_F' \cdot J \cdot A_F \cdot X \end{bmatrix} \right\|_2^2$$

$$= \left\| vec \begin{bmatrix} w_D' \cdot J \cdot A_D \cdot AM_{MOCS} \cdot WB_D \cdot X \\ w_A' \cdot J \cdot A_D \cdot AM_{MOCS} \cdot WB_A \cdot X \\ w_F' \cdot J \cdot A_D \cdot AM_{MOCS} \cdot WB_F \cdot X \end{bmatrix} - vec \begin{bmatrix} w_D' \cdot J \cdot A_D \cdot X \\ w_A' \cdot J \cdot A_A \cdot X \\ w_F' \cdot J \cdot A_F \cdot X \end{bmatrix} \right\|_2^2$$

If Q and P are denoted as follows.

$$Q = \begin{bmatrix} J \cdot A_D & 0 & 0 \\ 0 & J \cdot A_D & 0 \\ 0 & 0 & J \cdot A_D \end{bmatrix} \quad (3)$$

$$P = \begin{bmatrix} AM_{MOCS} & 0 & 0 \\ 0 & AM_{MOCS} & 0 \\ 0 & 0 & AM_{MOCS} \end{bmatrix}$$

Accordingly, the color error metric can be stated as:

$$CEM_{color}^2 = \left\| vec\left( Q \cdot P \cdot \begin{bmatrix} w'_D \cdot WB_D \cdot X \\ w'_A \cdot WB_A \cdot X \\ w'_F \cdot WB_F \cdot X \end{bmatrix} \right) - vec\left( \begin{bmatrix} w'_D \cdot J \cdot A_D \cdot X \\ w'_A \cdot J \cdot A_A \cdot X \\ w'_F \cdot J \cdot A_F \cdot X \end{bmatrix} \right) \right\|_2^2 \quad (4)$$

According to the property of Kronecker product, the above equation can be expressed as follows:

$$CEM_{color}^2 = \left\| \left( \begin{bmatrix} w'_D \cdot WB_D \cdot X \\ w'_A \cdot WB_A \cdot X \\ w'_F \cdot WB_F \cdot X \end{bmatrix}^T \otimes Q \right) \cdot vec(P) - vec\left( \begin{bmatrix} w'_D \cdot J \cdot A_D \cdot X \\ w'_A \cdot J \cdot A_A \cdot X \\ w'_F \cdot J \cdot A_F \cdot X \end{bmatrix} \right) \right\|_2^2 \quad (5)$$

Then $X_{MOCS}$ and $Y_{MOCS}$ are defined as:

$$X_{MOCS} = vec\left( \begin{bmatrix} w'_D \cdot J \cdot A_D \cdot X \\ w'_A \cdot J \cdot A_A \cdot X \\ w'_F \cdot J \cdot A_F \cdot X \end{bmatrix} \right),$$

$$Y_{MOCS} = \begin{bmatrix} w'_D \cdot WB_D \cdot X \\ w'_A \cdot WB_A \cdot X \\ w'_F \cdot WB_F \cdot X \end{bmatrix}^T \otimes Q \text{ and}$$

$$b_{MOCS} = vec(P) \Leftarrow \min(CEM_{color}^2)$$

By this notation, the color error metric is $$CEM_{color}^2 = \| Y_{MOCS} \cdot b_{MOCS} - X_{MOCS} \|_2^2 \quad (6)$$

As defined before, $$b_{MOCS} = vec(P) = vec\left( \begin{bmatrix} AM_{MOCS} & 0 & 0 \\ 0 & AM_{MOCS} & 0 \\ 0 & 0 & AM_{MOCS} \end{bmatrix} \right)$$

is a 81×1 vector which is solely determined by the adjustment matrix $AM_{MOCS}$. So $b_{MOCS}$ can be solved using least square method as $$b_{MOCS} = (Y_{MOCS}^T \cdot Y_{MOCS})^{-1} (Y_{MOCS}^T \cdot X_{MOCS}) \quad (7)$$

Substituting the terms in Eq. (7), leads to:

$$b_{MOCS} = \left[ \left( \begin{bmatrix} w'_D \cdot WB_D \cdot X \\ w'_A \cdot WB_A \cdot X \\ w'_F \cdot WB_F \cdot X \end{bmatrix}^T \otimes Q \right)^T \left( \begin{bmatrix} w'_D \cdot WB_D \cdot X \\ w'_A \cdot WB_A \cdot X \\ w'_F \cdot WB_F \cdot X \end{bmatrix}^T \otimes Q \right) \right]^{-1} \cdot \quad (8)$$

$$\left( \begin{bmatrix} w'_D \cdot WB_D \cdot X \\ w'_A \cdot WB_A \cdot X \\ w'_F \cdot WB_F \cdot X \end{bmatrix}^T \otimes Q \right)^T \cdot vec\left( \begin{bmatrix} w'_D \cdot J \cdot A_D \cdot X \\ w'_A \cdot J \cdot A_A \cdot X \\ w'_F \cdot J \cdot A_F \cdot X \end{bmatrix} \right)$$

Letting J be as follows:

$$J' = \begin{bmatrix} J & 0 & 0 \\ 0 & J & 0 \\ 0 & 0 & J \end{bmatrix}$$

then the following can be said $$b_{MOCS} = \left[ \left( \begin{bmatrix} w'_D \cdot WB_D \cdot X \\ w'_A \cdot WB_A \cdot X \\ w'_F \cdot WB_F \cdot X \end{bmatrix} \otimes Q^T \right) \left( \begin{bmatrix} w'_D \cdot WB_D \cdot X \\ w'_A \cdot WB_A \cdot X \\ w'_F \cdot WB_F \cdot X \end{bmatrix}^T \otimes Q \right) \right]^{-1} \cdot \quad (9)$$

$$\left( \begin{bmatrix} w'_D \cdot WB_D \cdot X \\ w'_A \cdot WB_A \cdot X \\ w'_F \cdot WB_F \cdot X \end{bmatrix}^T \otimes Q^T \right) \cdot$$

$$vec\left( J' \cdot \begin{bmatrix} w'_D \cdot A_D & 0 & 0 \\ 0 & w'_A \cdot A_A & 0 \\ 0 & 0 & w'_F \cdot A_F \end{bmatrix} \cdot \left( \begin{bmatrix} I_3 \\ I_3 \\ I_3 \end{bmatrix} \cdot X \right) \right)$$

Which leads to the following:

$$b_{MOCS} = \left[ \left( \begin{bmatrix} w'_D \cdot WB_D \cdot X \\ w'_A \cdot WB_A \cdot X \\ w'_F \cdot WB_F \cdot X \end{bmatrix} \cdot \begin{bmatrix} w'_D \cdot WB_D \cdot X \\ w'_A \cdot WB_A \cdot X \\ w'_F \cdot WB_F \cdot X \end{bmatrix}^T \right) \otimes (Q^T \cdot Q) \right]^{-1} \cdot \quad (10)$$

$$\left( \begin{bmatrix} w'_D \cdot WB_D \cdot X \\ w'_A \cdot WB_A \cdot X \\ w'_F \cdot WB_F \cdot X \end{bmatrix} \otimes Q^T \right) \cdot \left( \begin{bmatrix} I_3 \\ I_3 \\ I_3 \end{bmatrix} \cdot X \right)^T \otimes J' \right) \cdot$$

$$vec\left( \begin{bmatrix} w'_D \cdot A_D & 0 & 0 \\ 0 & w'_A \cdot A_A & 0 \\ 0 & 0 & w'_F \cdot A_F \end{bmatrix} \right)$$

Now the property of Kronecker product is applied again, $$b_{MOCS} = \left[ \left( \begin{bmatrix} w'_D \cdot WB_D \cdot X \\ w'_A \cdot WB_A \cdot X \\ w'_F \cdot WB_F \cdot X \end{bmatrix} \cdot \begin{bmatrix} w'_D \cdot WB_D \cdot X \\ w'_A \cdot WB_A \cdot X \\ w'_F \cdot WB_F \cdot X \end{bmatrix}^T \right) \otimes (Q^T \cdot Q) \right]^{-1} \cdot \quad (11)$$

$$\left( \begin{bmatrix} w'_D \cdot WB_D \cdot X \\ w'_A \cdot WB_A \cdot X \\ w'_F \cdot WB_F \cdot X \end{bmatrix} \cdot \left( \begin{bmatrix} I_3 \\ I_3 \\ I_3 \end{bmatrix} \cdot X \right)^T \otimes (Q^T \cdot J') \cdot$$

$$vec\left( \begin{bmatrix} w'_D \cdot A_D & 0 & 0 \\ 0 & w'_A \cdot A_A & 0 \\ 0 & 0 & w'_F \cdot A_F \end{bmatrix} \right)$$

Since the raw RGB data matrix X has dimension 3×r, $$\begin{bmatrix} w'_D \cdot WB_D \cdot X \\ w'_A \cdot WB_A \cdot X \\ w'_F \cdot WB_F \cdot X \end{bmatrix} = \begin{bmatrix} w'_D \cdot WB_D & 0 & 0 \\ 0 & w'_A \cdot WB_A & 0 \\ 0 & 0 & w'_F \cdot WB_F \end{bmatrix} \cdot \begin{bmatrix} I_3 \\ I_3 \\ I_3 \end{bmatrix} \cdot X \quad (12)$$

So if the corresponding terms are substituted in Eq. 11 by Eq. 12, the resulting expression is given as:

$$b_{MOCS} = \tag{13}$$

$$\left\{ \left( \begin{bmatrix} w'_D \cdot WB_D & 0 & 0 \\ 0 & w'_A \cdot WB_A & 0 \\ 0 & 0 & w'_F \cdot WB_F \end{bmatrix} \cdot \begin{bmatrix} I_3 \\ I_3 \\ I_3 \end{bmatrix} \cdot X \cdot X^T \cdot \right)^{-1} \otimes (Q^T \cdot Q) \right\} \cdot$$

$$[I_3 \ I_3 \ I_3] \cdot \begin{bmatrix} w'_D \cdot WB_D^T & 0 & 0 \\ 0 & w'_A \cdot WB_A^T & 0 \\ 0 & 0 & w'_F \cdot WB_F^T \end{bmatrix}$$

$$\left\{ \left( \begin{bmatrix} w'_D \cdot WB_D & 0 & 0 \\ 0 & w'_A \cdot WB_A & 0 \\ 0 & 0 & w'_F \cdot WB_F \end{bmatrix} \cdot \begin{bmatrix} I_3 \\ I_3 \\ I_3 \end{bmatrix} \cdot X \cdot X^T \cdot [I_3 \ I_3 \ I_3] \right) \otimes \right.$$

$$\left. (Q^T \cdot J') \cdot vec \left( \begin{bmatrix} w'_D \cdot A_D & 0 & 0 \\ 0 & w'_A \cdot A_A & 0 \\ 0 & 0 & w'_F \cdot A_F \end{bmatrix} \right) \right\}$$

When implementing the present invention for color calibration based on a Macbeth Color Checker, similar derivation can be applied and the expression for $AM_{MC24}$ is then given as follows:

$$b_{MC24} = vec \left( \begin{bmatrix} AM_{MC24} & 0 & 0 \\ 0 & AM_{MC24} & 0 \\ 0 & 0 & AM_{MC24} \end{bmatrix} \right) = \tag{14}$$

$$\left\{ \left( \begin{bmatrix} w'_D \cdot WB_D & 0 & 0 \\ 0 & w'_A \cdot WB_A & 0 \\ 0 & 0 & w'_F \cdot WB_F \end{bmatrix} \cdot \begin{bmatrix} M^T \cdot L_D \\ M^T \cdot L_A \\ M^T \cdot L_F \end{bmatrix} \cdot R \cdot R^T \cdot \right.$$

$$[L_D \cdot M \ L_A \cdot M \ L_F \cdot M] \cdot$$

$$\left. \begin{bmatrix} w'_D \cdot WB_D^T & 0 & 0 \\ 0 & w'_A \cdot WB_A^T & 0 \\ 0 & 0 & w'_F \cdot WB_F^T \end{bmatrix} \right)^{-1} \otimes (Q^T \cdot Q) \right\} \cdot$$

$$\left\{ \left( \begin{bmatrix} w'_D \cdot WB_D & 0 & 0 \\ 0 & w'_A \cdot WB_A & 0 \\ 0 & 0 & w'_F \cdot WB_F \end{bmatrix} \cdot \begin{bmatrix} M^T \cdot L_D \\ M^T \cdot L_A \\ M^T \cdot L_F \end{bmatrix} \cdot R \cdot R^T \cdot \right. \right.$$

$$[L_D \cdot M \ L_A \cdot M \ L_F \cdot M] \right) \otimes$$

$$\left. (Q^T \cdot J)' \cdot vec \left( \begin{bmatrix} w'_D \cdot A_D & 0 & 0 \\ 0 & w'_A \cdot A_A & 0 \\ 0 & 0 & w'_F \cdot A_F \end{bmatrix} \right) \right\}$$

3. Condition for Optimal Raw RGB.

In order to match the calibration performance between optimal raw RGB data X and a desired color standard R, such as Macbeth Color Checker, the complete condition is configured to match the corresponding adjustment matrix AM, i.e., $b_{MOCS} \approx b_{MC24}$. Comparing the two expressions of Eq. 13 and Eq. 14, it is noted that the two equations are very similar and the only difference involves the illuminant matrices. So the following can be stated $$b_{MOCS} = \approx b_{MC24} \Leftrightarrow \begin{bmatrix} I_3 \\ I_3 \\ I_3 \end{bmatrix} \cdot X \cdot \tag{15}$$

$$X^T \cdot [I_3 \ I_3 \ I_3] \approx \begin{bmatrix} M^T \cdot L_D \\ M^T \cdot L_A \\ M^T \cdot L_F \end{bmatrix} \cdot R \cdot R^T \cdot [L_D \cdot M \ L_A \cdot M \ L_F \cdot M]$$

The right side of Eq. 15 shows the complete and necessary condition to address the equality between adjustment matrices $b_{MOCS}$ and $b_{MC24}$. The rational behind this is based on the following. (1) The object of finding optimal raw RGB data X which has the same calibration performance as a known calibration standard (e.g., Macbeth Color Checker). (2) Toward achieving an identical calibration performance, the complete condition preferably has the same adjustment matrix, (i.e., $b_{MOCS} = b_{MC24}$). (3) In response to comparing Eq. 13 and Eq. 14, $b_{MOCS} = b_{MC24}$, results in the condition shown in equation Eq. 15. (4) Toward finding optimal X which satisfies the condition in Eq. 15, the ONMF algorithm is implemented as shown in the following section.

4. New ONMF Algorithm for Optimal Raw RGB Generation.

The following definition of the ONMF problem is the same as the original ONMF, however, toward solving the specific problem of finding optimal raw RGB data, a different definition of matrices V and W is given, as outlined below and is meant herein as the understanding of the "new" ONMF algorithm.

The original optimal non-negative matrix factorization (ONMF) problem is configured to solve the following:

$$V_{n \times m} \approx W_{n \times r} \cdot H_{r \times m} \text{ where } W \geq 0, H \geq 0, H \cdot H^T = I \tag{16}$$

The orthogonality constraint of weight matrix H assures that $V \cdot V^T \approx W \cdot W^T$. The concept of colored rays has already been mentioned which involves the effect of both spectral reflectance and illuminant. When associating the calibration formulation of Eq. 15 with the original ONMF problem of Eq. 16. The following are defined:

$$V = \begin{bmatrix} M^T \cdot L_D \\ M^T \cdot L_A \\ M^T \cdot L_F \end{bmatrix} \cdot R$$

and $$W = \begin{bmatrix} I_3 \\ I_3 \\ I_3 \end{bmatrix} \cdot X,$$

then the relationship holds, $$V \cdot V^T \approx W \cdot W^T \Leftrightarrow \begin{bmatrix} M^T \cdot L_D \\ M^T \cdot L_A \\ M^T \cdot L_F \end{bmatrix} \cdot R \cdot$$

$$R^T \cdot [L_D \cdot M \ L_A \cdot M \ L_F \cdot M] \approx \begin{bmatrix} I_3 \\ I_3 \\ I_3 \end{bmatrix} \cdot X \cdot X^T \cdot [I_3 \ I_3 \ I_3]$$

This is exactly our requirement to match the calibration performance of optimal raw RGB data and Macbeth. Therefore, optimal non-negative matrix factorization (ONMF) can be readily applied to solve the problem of illuminant independent calibration.

5 Implementation.

Figure 5:
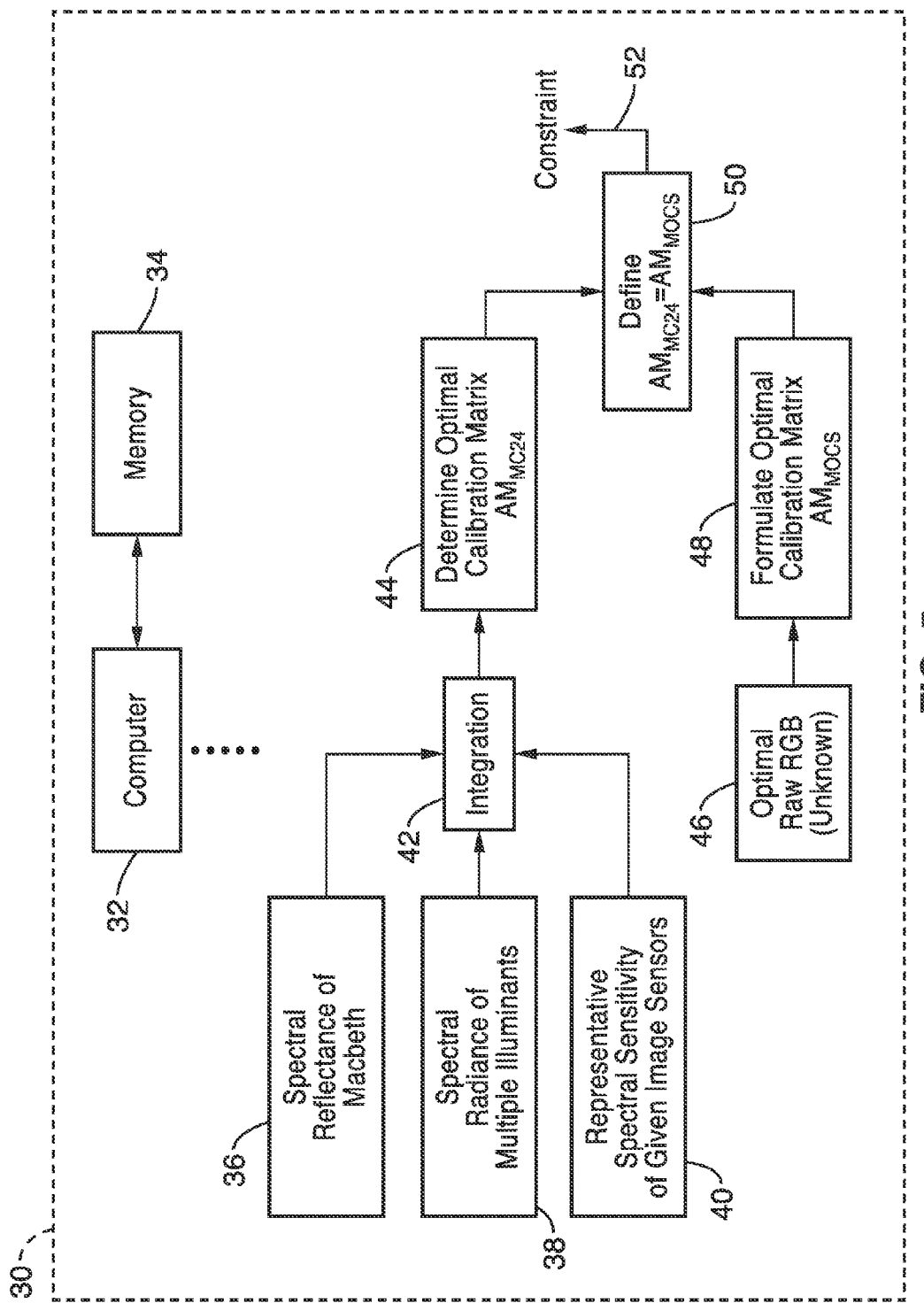
FIG. 5 is a block diagram of constraint derivation according to an aspect of the present invention.

FIG. 5 illustrates an example constraint generation embodiment 30 shown executing as programming stored in memory 34 for execution on a computer 32, summarizing the new ONMF algorithm and constraint was arrived at. First the adjustment matrix (e.g., ($AM_{MC24}$)) is formulated from a standard color chart (Macbeth) as in block 44. For the adjustment matrix ($AM_{MOCS}$), raw RGB data X is used to formulate it as an unknown parameter. The formulation process was described in Section 2. By comparing formulations of Eq. 13 and Eq. 14, a constraint as shown by Eq. 15 is defined.

Summarizing the blocks of the figure, spectral reflectance 36 of a desired color standard, such as Macbeth (e.g., Macbeth 24), and the spectral radiance 38 of multiple illuminants, along with representative spectral sensitivity 40 of a given type or range of image sensors is integrated 42 then an optimal calibration matrix is generated 44 for the desired standard (e.g., ($AM_{MC24}$)). Optimal raw RGB is received 46 and a new optimal calibration matrix ($AM_{MOCS}$) is formulated 48. Then in response to setting ($AM_{MC24}$)=($AM_{MOCS}$) 50 a constraint 52 is generated.

Figure 6:
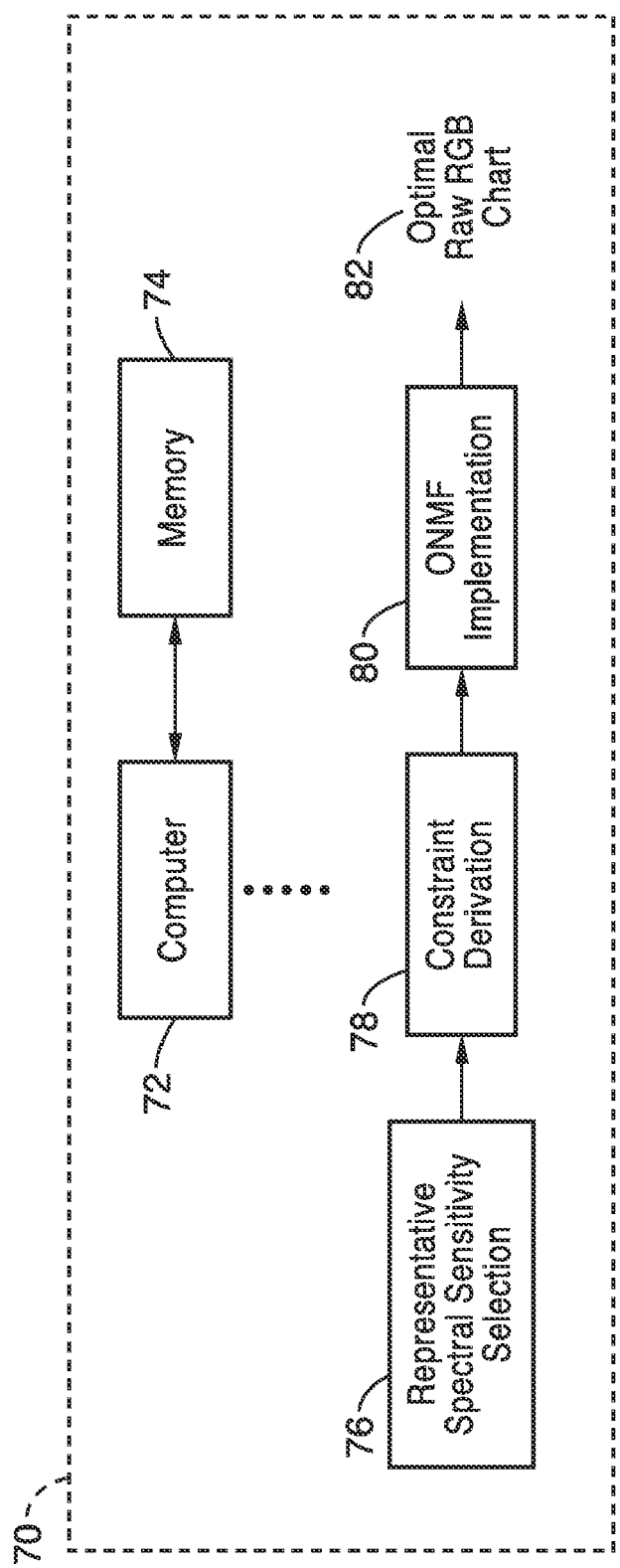
FIG. 6 is a block diagram optimal raw RGB determination according to an aspect of the present invention.

FIG. 6 illustrates an example optimal raw RGB determination embodiment 70 shown executing as programming stored in memory 74 for execution on a computer 72. A representative spectral sensitivity is selected 76 from which is derived a constraint 78 and from which optimal non-negative matrix factorization (ONMF) is implemented 80 to generate an optimal raw RGB color chart 82. The constraint is derived in step 78 in response to matching the calibration performance between the optimal raw RGB chart and a desired calibration standard (e.g., Macbeth Color Checker) under multiple illuminants for the specific image sensors. It should be appreciated that a comparison step lets $AM_{MC24}$= $AM_{MOCS}$, and solves this equation to find the constraint for calculating the unknown raw RGB parameter. One aspect of the invention calculates the unknown raw RGB parameter. In this case the original ONMF algorithm is adapted using the previously derived constraint and implemented to calculate the optimal raw RGB data.

Figure 7:
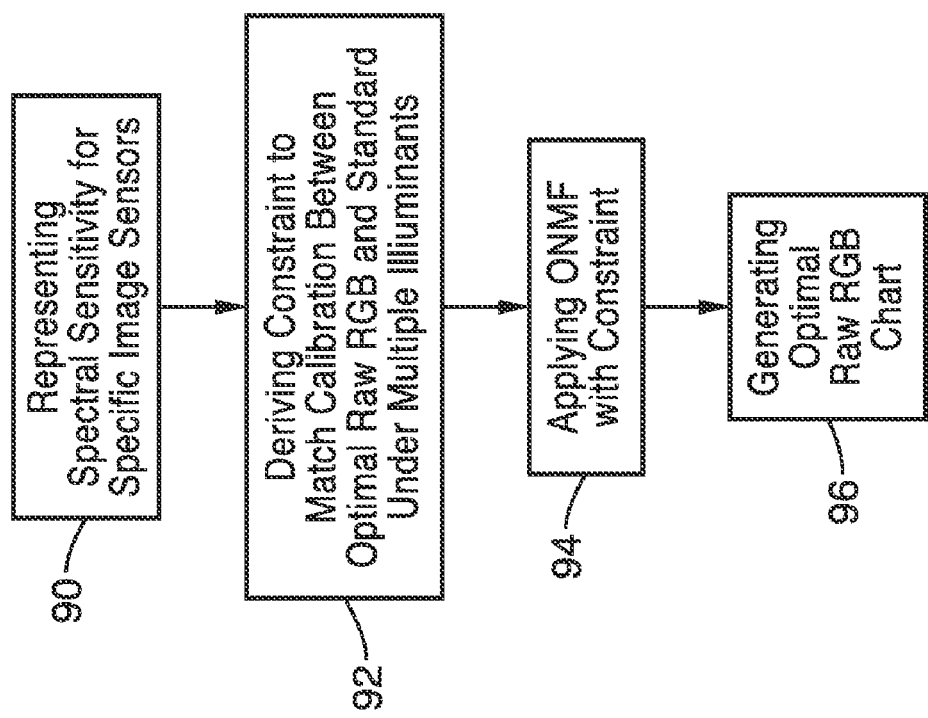
FIG. 7 is a flowchart of generating a raw RGB chart according to an aspect of the present invention.

FIG. 7 illustrates an example embodiment for generating an optimal raw RGB color chart. Programming executable on a computer system is configured for representing 90 a spectral sensitivity function for a specific type, or range of types, of image sensors. Operations are performed for deriving a constraint 92 to match the calibration performance between the optimal raw RGB chart and the Macbeth Color Checker under multiple illuminants for the specific image sensors. Then the optimal non-negative matrix factorization (ONMF) is applied 94 with the constraint and finally the optimal raw RGB chart is generated 96. It will be appreciated that the computer is preferably configured to output the color chart as an image file which can be printed on a printer device capable of providing sufficient color and intensity control.

Figure 8:
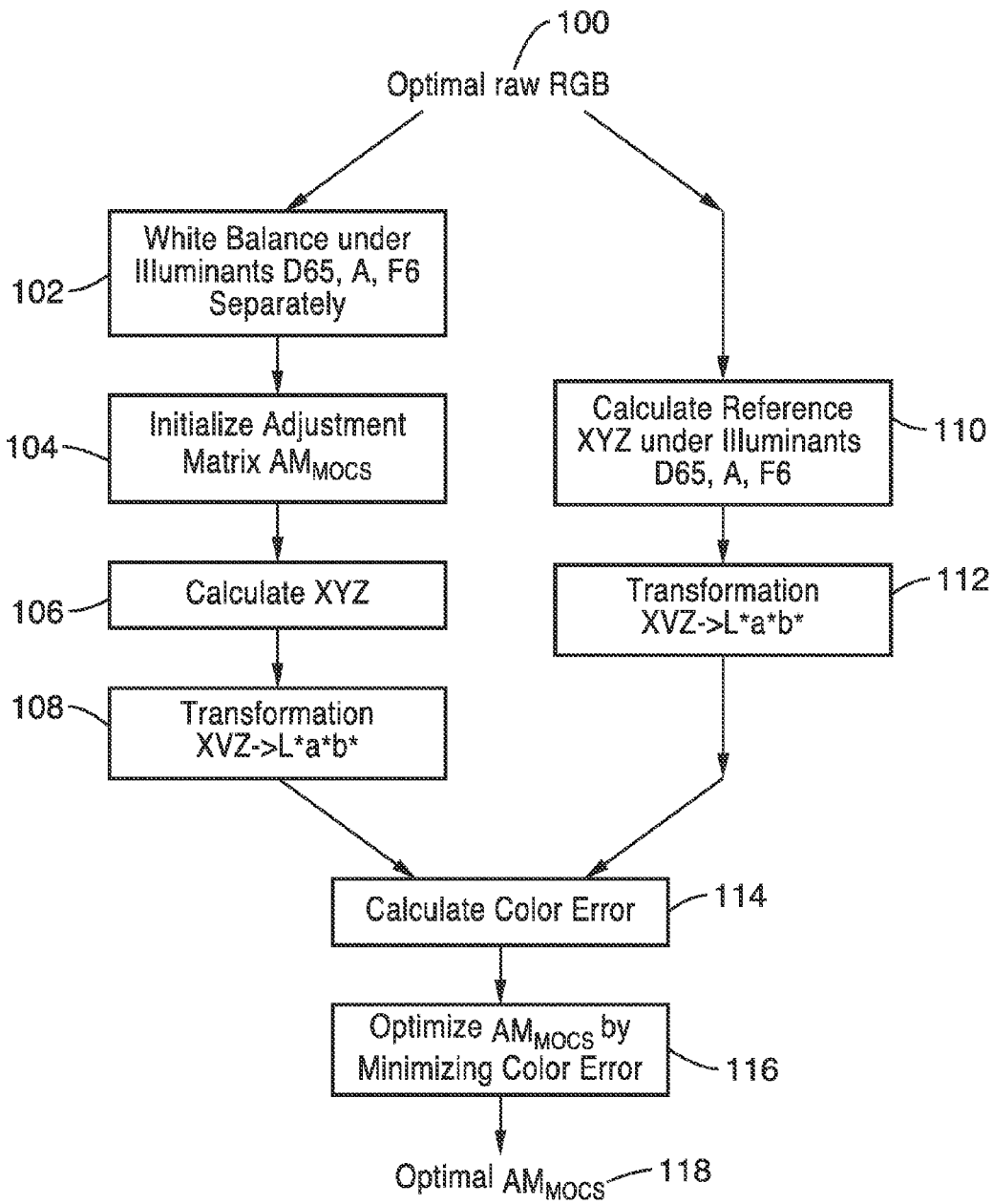
FIG. 8 is a flowchart of performing calibration for a given type of imaging device using the raw RGB chart from FIG. 7, according to an aspect of the present invention.

FIG. 8 illustrates an example embodiment performing image sensor specific, illuminant independent, calibration utilizing the optimal raw RGB color chart. The flowchart of FIG. 8 depicts two constituent parts of the present invention. The first being the phase, as shown in FIG. 5, in which formulation of $AM_{MC24}$ is calculated with all parameters known. Then the second phase is the formulation of $AM_{MOCS}$, as described in section 2, using an unknown parameter X which is the optimal raw RGB to be created. So the comparison step means to let $AM_{MC24}$=$AM_{MOCS}$. The equation is then solved to find the constraint for calculating the unknown raw RGB parameter. The original ONMF algorithm is preferably adapted using the previously derived constraint and implemented to calculate the optimal raw RGB data. Later sections describe how to calculate the unknown raw RGB parameter.

Utilizing the optimal raw RGB chart 100, white balance is determined in step 102 under different illuminants, depicted as D65, A and F6. An adjustment matrix for $AM_{MOCS}$ is initialized per step 104. XYZ is calculated in step 106 and transformation of XYZ color space to the L*a*b* color space is performed in step 108. Prior to the comparison aspects, reference XYZ is calculated under the different illuminants as shown in step 110, and transformation XYZ to L*a*b* performed in step 112. The comparison is performed in step 114 with color error determined, from which $AM_{MOCS}$ is optimized in step 116 to produce an optimal $AM_{MOCS}$ in step 118.

It should be appreciated that although the description recites performing camera calibration which is considered to include various color characterization, correction and calibration processes. Creation and use of optimal color chart teachings according to the present invention can be utilized for performing any operations in which color charts are traditionally utilized, including but not limited to the following: checking color reproduction, demosaicking, denoising, white balancing, color correction, and so forth. By reducing the number of colors, such as from twenty four, to a small set, the design process can be significantly sped up in any application utilizing a color chart. Moreover, since the colors in the optimal set incorporate sensor characteristics, the resulting implementations would yield increased performance.

In view of the foregoing description, it will be appreciated that the present invention provides methods and apparatus for performing optimal raw RGB calibrations, such as of digital still cameras. The present invention includes the following inventive embodiments among others:

1. An apparatus for generating an optimal raw RGB illumination independent color chart for use with an image sensor, comprising: a computer configured for performing image processing; and programming executable on said computer for, representing spectral sensitivity for a specific type of image sensor; deriving a constraint to match calibration performance between a desired optimal raw RGB color chart and a desired color standard under multiple illuminants for a specific type of image sensor; applying orthogonal non-negative matrix factorization (ONMF) with the constraint; and generating an optimal raw RGB color chart for use when collecting an optimal raw RGB data set when performing illuminant independent, image sensor specific color calibration operations.

2. An apparatus according to embodiment 1, wherein said optimal raw RGB color chart is configured to incorporate various spectral sensitivities performance matching of the desired color standard under multiple illuminants.

3. An apparatus according to embodiment 2, wherein said optimal raw RGB color chart has the same calibration performance as a known calibration standard.

4. An apparatus according to embodiment 2, wherein said optimal raw RGB color chart has the same calibration performance as a Macbeth Color Checker.

5. An apparatus according to embodiment 1, wherein said constraint is derived by programming executable on said computer for: integrating spectral reflectance of the desired color standard, spectral radiance of multiple illuminants, and representative spectral sensitivities of the specific type of image sensor; determining an optimal calibration matrix for the desired color standard; determining an optimal calibration matrix for the optimal raw RGB calibration matrix; and generating said constraint in response to equalizing optimal calibration matrixes for the desired color standard and the optimal raw RGB calibration.

6. An apparatus according to embodiment 1, wherein said optimal raw RGB data set comprises illuminant variation so that illuminant-independent calibration can be performed in response to capturing a single image.

7. An apparatus according to embodiment 1, wherein said optimal raw RGB color chart is determined in response to non-negative matrix factorization (ONMF) of a comparison between the adjustment matrix and a known calibration adjustment matrix.

8. An apparatus according to embodiment 1, further comprising programming for calibrating an image sensor utilizing said optimal raw RGB color chart, comprising: performing a white balance under a plurality of different illuminants and initializing an adjustment matrix and determining a response in an XYZ color space and transforming it to a first response in a L*a*b* color space; determining a response in an XYZ color space under a plurality of different illuminants and transforming it to a second response in a L*a*b* color space; and modifying said adjustment matrix to minimize error between said first L*a*b* result and said second L*a*b* result toward optimizing calibration.

9. An apparatus for performing color calibration of a specific type of image sensor within a camera device, comprising: a computer configured for performing image processing; and programming executable on said computer for, generating an optimal raw RGB color chart in response to representing spectral sensitivity for a specific type of image sensor with a constraint derived to match calibration performance with a desired color standard under multiple illuminants, and applying orthogonal non-negative matrix factorization (ONMF) with the constraint, performing a white balance under a plurality of different illuminants and initializing an adjustment matrix, determining a first response in an XYZ color space and transforming it to a first response in an L*a*b* color space, determining a second response in an XYZ color space under a plurality of different illuminants and transforming it to a second response in the L*a*b* color space, and modifying said adjustment matrix to minimize error between said first response in the L*a*b* color space and said second response in the L*a*b* color space.

10. An apparatus according to embodiment 9, wherein said optimal raw RGB color chart is configured to incorporate various spectral sensitivities for matching the performance of the desired color standard under multiple illuminants.

11. An apparatus according to embodiment 9, wherein said optimal raw RGB color chart has the same calibration performance as a known calibration standard.

12. An apparatus according to embodiment 11, wherein said optimal raw RGB color chart has the same calibration performance as a the Macbeth Color Checker.

13. An apparatus according to embodiment 9, wherein said constraint is derived by programming executable on said computer for: integrating spectral reflectance of the desired color standard, spectral radiance of multiple illuminants, and representative spectral sensitivities for the specific type of image sensor; determining an optimal calibration matrix for the desired color standard; determining an optimal calibration matrix for the optimal raw RGB calibration matrix; and generating said constraint in response to equalizing the optimal calibration matrixes for the desired color standard and the optimal raw RGB calibration.

14. An apparatus according to embodiment 9, wherein color calibration is performed using said optimal RGB color chart to provide illuminant-independent calibration in response to the capture of a single image.

15. An apparatus according to embodiment 9, wherein said optimal raw RGB color chart is determined in response to non-negative matrix factorization (ONMF) of a comparison between the adjustment matrix and a known calibration adjustment matrix.

16. A method of generating an optimal raw RGB color chart for use in color calibration using a specific type of image sensor for a camera device being calibrated, comprising: representing spectral sensitivity for a specific type of image sensor; deriving a constraint to match calibration performance between a desired optimal raw RGB chart and a standard under multiple illuminants for the specific type of image sensor for the camera device; applying orthogonal non-negative matrix factorization (ONMF) with the constraint; and generating an optimal raw RGB color chart for use in performing illuminant independent, image sensor specific, color calibration.

17. A method according to embodiment 16, wherein said optimal raw RGB color chart is configured to incorporate various spectral sensitivities for performance matching of a desired color standard under multiple illuminants.

18. A method according to embodiment 16, wherein said optimal raw RGB color chart provides identical performance as a Macbeth Color Checker, while having fewer color swatches and configured for use with a single illuminant source.

19. A method according to embodiment 16, wherein said constraint is derived by steps comprising: integrating spectral reflectance of the desired color standard, spectral radiance of multiple illuminants, and representative spectral sensitivities of the specific type of image sensor; determining an optimal calibration matrix for a desired color standard; determining an optimal calibration matrix for an optimal raw RGB calibration matrix; and generating said constraint in response to equalizing calibration matrixes between the desired color standard and the optimal raw RGB calibration matrix.

20. A method according to embodiment 16, further comprising calibrating an image sensor utilizing said optimal raw RGB color chart, comprising: performing a white balance under a plurality of different illuminants and initializing an adjustment matrix and determining a first response in an XYZ color space and transforming it to a first response in a L*a*b* color space; determining a second response in XYZ color space under a plurality of different illuminants and transforming it to a second response in a L*a*b* color space; and modifying said adjustment matrix to minimize error between said first response in the L*a*b* color space and said second response in the L*a*b* color space.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for generating an optimal raw RGB illumination independent color chart for use with an image sensor, comprising:
   a computer configured for performing image processing; and
   programming executable on said computer for performing steps comprising:
      representing spectral sensitivity for a specific type of image sensor;
      deriving a constraint to match calibration performance between a desired optimal raw RGB color chart and a desired color standard under multiple illuminants for a specific type of image sensor;
      applying orthogonal non-negative matrix factorization (ONMF) with the constraint; and
      generating an optimal raw RGB color chart for use when collecting an optimal raw RGB data set when performing illuminant independent, image sensor specific color calibration operations.

2. An apparatus as recited in claim 1, wherein said optimal raw RGB color chart is configured to incorporate various spectral sensitivities performance matching of the desired color standard under multiple illuminants.

3. An apparatus as recited in claim 2, wherein said optimal raw RGB color chart has the same calibration performance as a known calibration standard.

4. An apparatus as recited in claim 2, wherein said optimal raw RGB color chart has the same calibration performance as a Macbeth Color Checker.

5. An apparatus as recited in claim 1, wherein said constraint is derived by programming executable on said computer for:
   integrating spectral reflectance of the desired color standard, spectral radiance of multiple illuminants, and representative spectral sensitivities of the specific type of image sensor;
   determining an optimal calibration matrix for the desired color standard;
   determining an optimal calibration matrix for the optimal raw RGB calibration matrix; and
   generating said constraint in response to equalizing optimal calibration matrixes for the desired color standard and the optimal raw RGB calibration.

6. An apparatus as recited in claim 1, wherein said optimal raw RGB data set comprises illuminant variation so that illuminant-independent calibration can be performed in response to capturing a single image.

7. An apparatus as recited in claim 1, wherein said optimal raw RGB color chart is determined in response to non-negative matrix factorization (ONMF) of a comparison between the adjustment matrix and a known calibration adjustment matrix.

8. An apparatus as recited in claim 1, further comprising programming executable on said computer for calibrating an image sensor utilizing said optimal raw RGB color charts by performing steps comprising:
   performing a white balance under a plurality of different illuminants and initializing an adjustment matrix and determining a response in an XYZ color space and transforming it to a first response in a L*a*b* color space;
   determining a response in an XYZ color space under a plurality of different illuminants and transforming it to a second response in a L*a*b* color space; and
   modifying said adjustment matrix to minimize error between said first L*a*b* result and said second L*a*b* result toward optimizing calibration.

9. An apparatus for performing color calibration of a specific type of image sensor within a camera device, comprising:
   a computer configured for performing image processing; and
   programming executable on said computer for performing steps comprising:
      generating an optimal raw RGB color chart in response to representing spectral sensitivity for a specific type of image sensor with a constraint derived to match calibration performance with a desired color standard under multiple illuminants, and applying orthogonal non-negative matrix factorization (ONMF) with the constraint,
      performing a white balance under a plurality of different illuminants and initializing an adjustment matrix, determining a first response in an XYZ color space and transforming it to a first response in an L*a*b* color space,
      determining a second response in an XYZ color space under a plurality of different illuminants and transforming it to a second response in the L*a*b* color space, and
      modifying said adjustment matrix to minimize error between said first response in the L*a*b* color space and said second response in the L*a*b* color space.

10. An apparatus as recited in claim 9, wherein said optimal raw RGB color chart is configured to incorporate various spectral sensitivities for matching the performance of the desired color standard under multiple illuminants.

11. An apparatus as recited in claim 9, wherein said optimal raw RGB color chart has the same calibration performance as a known calibration standard.

12. An apparatus as recited in claim 11, wherein said optimal raw RGB color chart has the same calibration performance as a the Macbeth Color Checker.

13. An apparatus as recited in claim 9, wherein said constraint is derived by programming executable on said computer for performing steps comprising:

integrating spectral reflectance of the desired color standard, spectral radiance of multiple illuminants, and representative spectral sensitivities for the specific type of image sensor;

determining an optimal calibration matrix for the desired color standard;

determining an optimal calibration matrix for the optimal raw RGB calibration matrix; and generating said constraint in response to equalizing the optimal calibration matrixes for the desired color standard and the optimal raw RGB calibration.

14. An apparatus as recited in claim 9, wherein color calibration is performed using said optimal RGB color chart to provide illuminant-independent calibration in response to capturing single image.

15. An apparatus as recited in claim 9, wherein said optimal raw RGB color chart is determined in response to non-negative matrix factorization (ONMF) of a comparison between the adjustment matrix and a known calibration adjustment matrix.

16. A method of generating an optimal raw RGB color chart for use in color calibration using a specific type of image sensor for a camera device being calibrated, comprising:

representing spectral sensitivity for a specific type of image sensor;

deriving a constraint to match calibration performance between a desired optimal raw RGB chart and a standard under multiple illuminants for the specific type of image sensor for the camera device;

applying orthogonal non-negative matrix factorization (ONMF) with the constraint; and generating an optimal raw RGB color chart for use in performing illuminant independent, image sensor specific, color calibration.

17. A method as recited in claim 16, wherein said optimal raw RGB color chart is configured to incorporate various spectral sensitivities for performance matching of a desired color standard under multiple illuminants.

18. A method as recited in claim 16, wherein said optimal raw RGB color chart provides identical performance as a Macbeth Color Checker, while having fewer color swatches and configured for use with a single illuminant source.

19. A method as recited in claim 16, wherein said constraint is derived by steps comprising:

integrating spectral reflectance of the desired color standard, spectral radiance of multiple illuminants, and representative spectral sensitivities of the specific type of image sensor;

determining an optimal calibration matrix for a desired color standard;

determining an optimal calibration matrix for an optimal raw RGB calibration matrix; and generating said constraint in response to equalizing calibration matrixes between the desired color standard and the optimal raw RGB calibration matrix.

20. A method as recited in claim 16, further comprising calibrating an image sensor utilizing said optimal raw RGB color chart, comprising:

performing a white balance under a plurality of different illuminants and initializing an adjustment matrix and determining a first response in an XYZ color space and transforming it to a first response in a L*a*b* color space;

determining a second response in XYZ color space under a plurality of different illuminants and transforming it to a second response in a L*a*b* color space; and modifying said adjustment matrix to minimize error between said first response in the L*a*b* color space and said second response in the L*a*b* color space.

* * * * *